Aug. 12, 1952 E. B. THOMPSON 2,606,523
MILKING MACHINE
Filed Feb. 23, 1949 2 SHEETS—SHEET 1
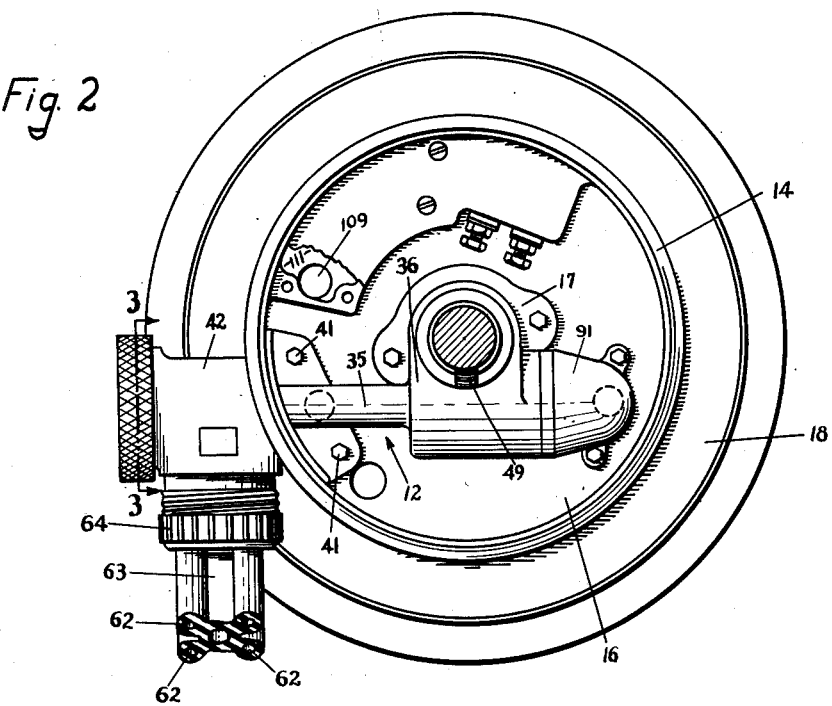
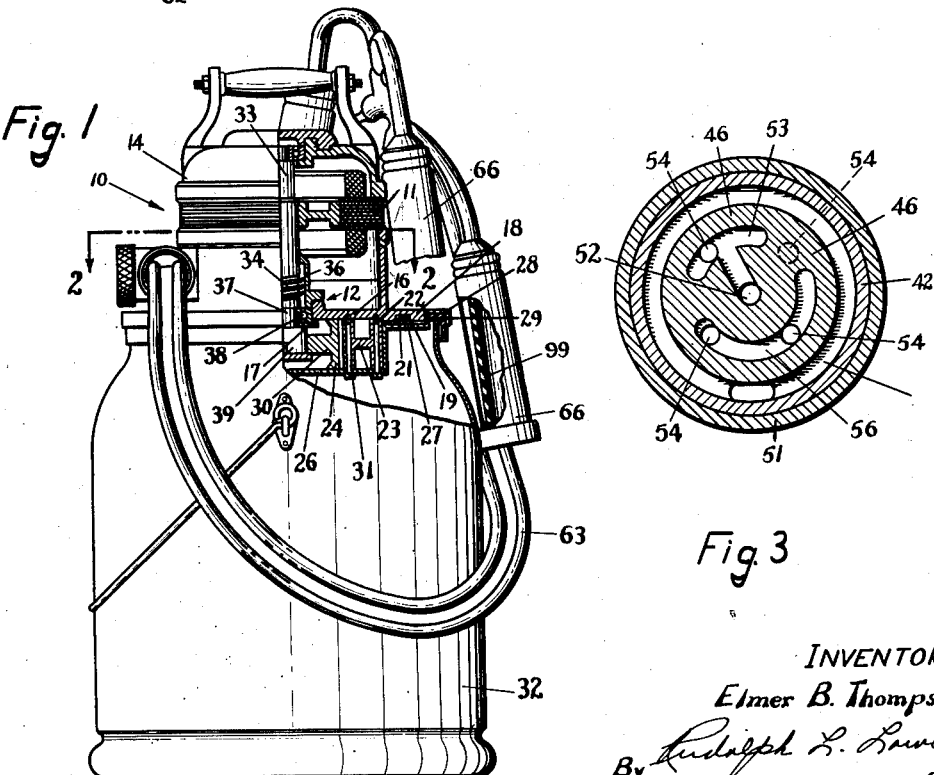
INVENTOR
Elmer B. Thompson
By Rudolph L. Lowell
Atty.

INVENTOR
Elmer B. Thompson

Patented Aug. 12, 1952

2,606,523

UNITED STATES PATENT OFFICE 2,606,523

MILKING MACHINE

Elmer B. Thompson, Des Moines, Iowa, assignor to Globe Hoist Company, Des Moines, Iowa, a corporation of Iowa Application February 23, 1949, Serial No. 77,727

3 Claims. (Cl. 119—14.4)

This invention relates generally to milking machines and in particular to a portable milking machine of pulsator type having a power unit carried on a milk receptacle.

In a milking machine of this type, and as shown in U. S. Patent 2,427,312, the power unit is provided with an air connection and a milk connection adapted to be connected with a teat cup of inflation type. A housing for the power unit has a first chamber at a substantially atmospheric pressure and a second air chamber at a subatmospheric pressure. An air distributing means functions to alternately supply air from these two chambers to the air connection. A suction pump has its inlet open to the subatmospheric chamber and to the milk receptacle to concurrently exhaust air therefrom for discharge to the atmosphere. The air distributing means and pump are operated by a common motor which is also located in the power unit housing.

The pump is air cooled and for this purpose the housing is formed with an air passage which extends about a portion of the pump. Air from the atmospheric chamber first enters the distributing means, for supply to the teat cup, is then returned to the air distributing means for admission to the pump inlet by way of the pump air cooling passage, and from the pump is discharged to the atmosphere.

Although this power unit in U. S. Patent 2,427,312 is generally satisfactory in operation, the flow of air through the teat cup and air distributing means, prior to its passage through the pump air cooling passage, has been found to be objectionable due to the fact that on any rupture of the teat cup inflation, milk is admitted into the air cooling passage. By virtue of the length and construction of the air cooling passage any milk therein tends to remain rather than to be moved therefrom by the pump. Further, since this passage becomes warm in the operation of the milking machine, and can be thoroughly cleaned only with some inconvenience and difficulty, the milk therein soon becomes rancid and odorous.

It is an object of this invention, therefore, to provide a milking machine of the above described type in which milk is positively prevented from entering the pump air cooling passage.

A further object of this invention is to provide an improved power unit for a milking machine of the pulsator type.

Still another object of this invention is to provide a milking machine of pulsator type having a self-contained power unit in which the air exhausted from a teat cup is admitted directly to a pump inlet so that any milk entrained in the exhaust air is discharged from the power unit to the atmosphere.

Further objects, features and advantages of this invention will become apparent from the following description when taken in connection with the accompanying drawings, in which:

Fig. 1 is a side elevational view of a milking machine of pulsator type with a part of the power unit and a teat cup thereof broken away for the purpose of clarity;

Fig. 2 is an enlarged sectional view taken substantially on the line 2—2 in Fig. 1;

Fig. 3 is an enlarged sectional view as seen on the line 3—3 in Fig. 2;

Figure 4:
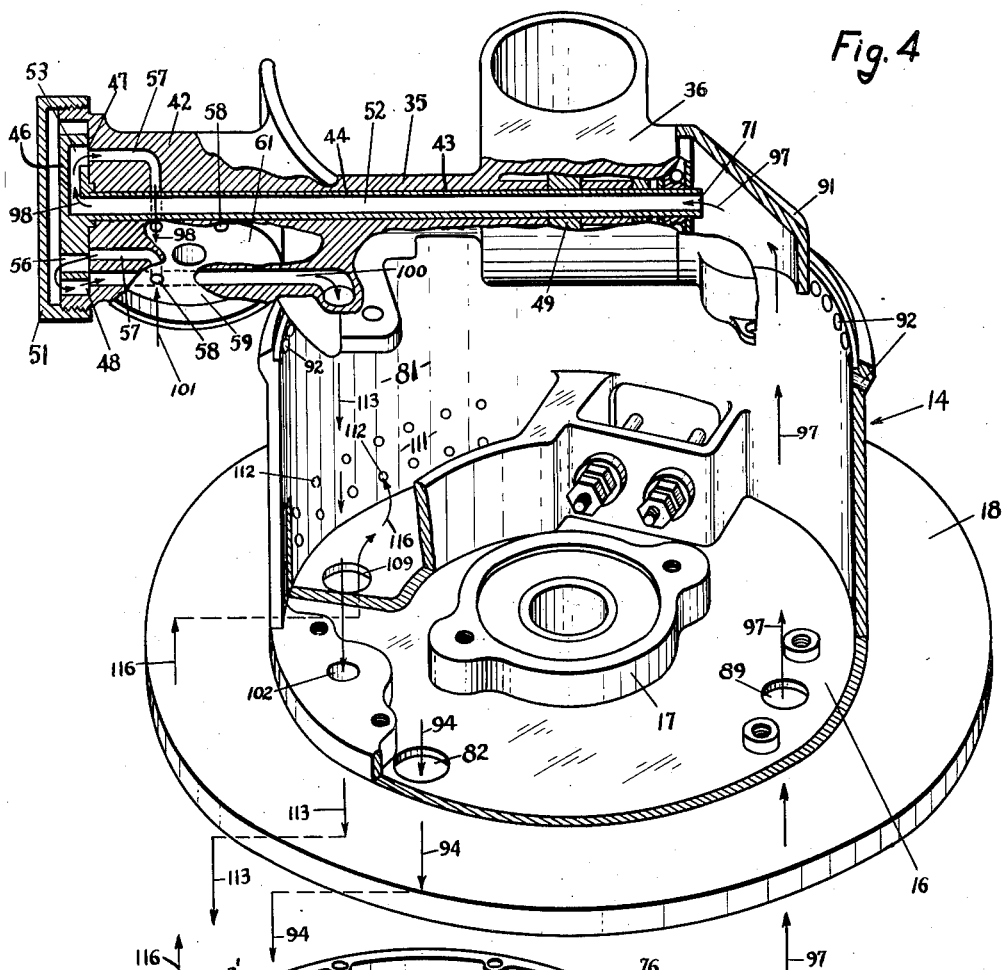
Fig. 4 is an enlarged fragmentary exploded perspective view of the power unit with parts removed and other parts broken away to show the flow of air therethrough.

With reference to the drawings the power unit 10 of this invention is illustrated in Fig. 1 as including a motor 11 and an air distributing means 12 assembled within a main housing 14 having its bottom end closed by a lower side wall or base 16. The base 16 is formed with a center journal 17 and a laterally extended annular flange 18. The under side of the flange 18 is formed with an annular recess 19 to receive a gasket 21, and the under side of the bottom wall 16 has an annular cut-away portion 22 to receive in a close fit the upper end of an annular casing or housing 23 for a pump of rotary eccentric type, generally indicated at 24.

The pump casing 23 is provided with a cover 26 integrally formed with an annular lateral flange 27 engageable with the gasket 21 and terminating in an annular pocket 28 for receiving a gasket 29. The cover 26 and housing 23 are secured to the main housing 14 by screws 31. It is thus seen that the motor 11, air distributing means 12, and the pump 24 are fully enclosed by the housing 14 and casing 23 so that the power unit 10 is a package or self-contained unit. The gasket 29, when the power unit 10 is positioned over a milk receptacle 32, rests on the receptacle rim so that the power unit constitutes a cover for the receptacle.

The motor 11 (Fig. 1) has an upright shaft 33, the upper end of which is suitably carried within the top end of the housing 14. Adjacent its lower end, the motor shaft 33 has a worm section 34 positioned within a gear casing 36, that forms part of a body member 35 in the air distributing means 12, and a section 37 which is rotatably supported in a bearing 38 mounted in the base journal 17. The lower end projects within the pump casing 23 and terminates in an eccentric 39 which is suitably connected with a pump rotor 30 to operate the same. A detailed description of the relative construction and assembly of the motor shaft 11 with the pump rotor 30 will be found in U. S. Patent 2,427,312.

The body member 35 of the air distributing means 12 is secured to the base 16 by screws 41 and extends laterally of the power unit 10 (Figs. 2 and 4), with an end section 42 thereof projected outwardly from the housing 14 at a position above the base 16. A rotary valve member 43 (Fig. 4) has a tubular stem 44 supported axially of the body member 35 and a head member 46 adapted to rotate in a seated engagement with a valve seat 47, which constitutes the bottom side of an annular cavity 48 formed in the outer or projected end 42 of the body member 35. The inner or free end of the valve stem 44 projects through the gear casing 36 and within such casing carries a worm gear 49 which is in meshed engagement with the worm section 34 on the motor shaft. It is seen, therefore, that the motor 11, air distributing means 12 and pump 24 are arranged in relative superposed positions within the power unit 10, and with the air distributing means and the pump being driven directly by the motor 11.

The cavity 48 (Fig. 4) is closed by a cover or cap 51 threaded about the projected end 42 of the body member 35 so as to be spaced from the valve head 46. An air chamber is thus formed by the cavity 48 and cap 46 which shall be referred to hereinafter as a subatmospheric air chamber, namely, a chamber having air therein at a subatmospheric pressure. An air passage 52 within the tubular stem 44 extends radially and then axially through the valve head 46 so that the end 53 thereof is open to the valve seat 47. This end 53 of the air passage 52 is of an arcuate shape, as best appears in Fig. 3, and upon rotation of the valve member 43 passes in succession over a series of spaced air openings 54 formed in the valve seat 47. Oppositely arranged from the arcuate passage end 53 and formed in the valve head member 46 is an arcuate slot 56, of a longer length than the passage end 53, which is also arranged to pass in succession over the air openings 54.

The air openings 54 constitute one of the ends of air passages 57 (Fig. 4), formed in the body member 35, and having their opposite ends 58 in the bottom 59 of an annular cavity 61 formed in the body member 35. The passage ends 58 are connected in registration with air passages 62 (Fig. 2) in a flexible conduit 63 through a coupling unit indicated generally as 64. The conduit 63, as illustrated in Fig. 1, connects the power unit with teat cups 66 of inflation type. For a more detailed description of the valve head 46, the subatmospheric chamber 48 and air passages 57, reference is made to U. S. Patent 2,427,312.

The end 71 of the air passage 52 in the tubular valve stem 44 constitutes an inlet for supplying air at an atmospheric pressure to the distributing means 12, as will appear hereinafter. On rotation of the valve member 43, therefore, air at an atmospheric or high pressure is supplied to the air passages 57 from the inlet 71, and air at a subatmospheric pressure is supplied to the passages 57 from the subatmospheric chambers 48 through the arcuate slot 56. By virtue of the opposite arrangement of the passage end 53 and arcuate slot 56 in the head member 46, air is thus alternately supplied at high and low pressures to the air passages 57.

Figure 5:
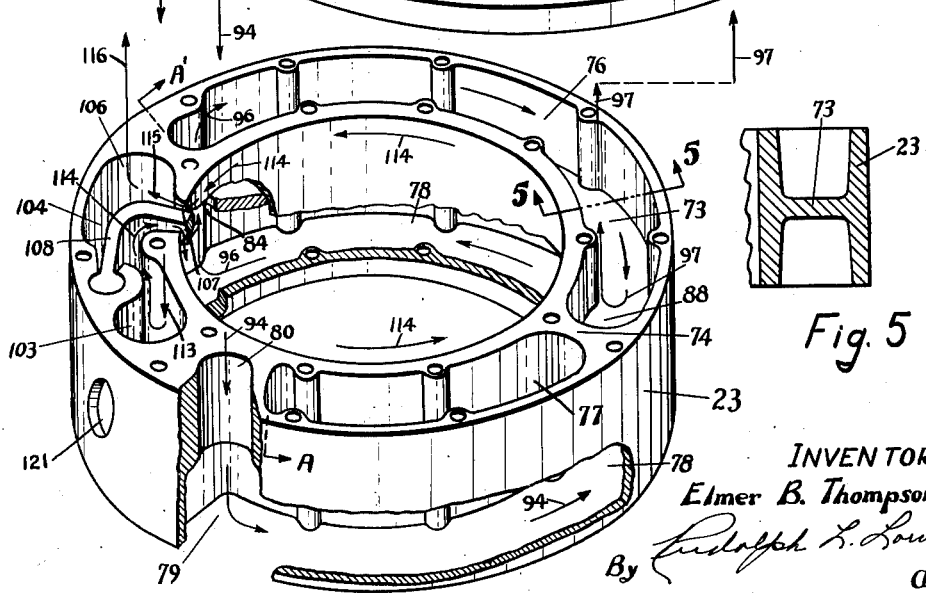
Fig. 5 is a sectional view taken along the line 5—5 in Fig. 4.

The pump casing 23 (Fig. 4) is of an annular shape and over that portion thereof, extended between the numerals A and A', is of a generally H-shape in transverse cross section, as best appears in Fig. 5. That part of the casing 23, which is of an H-shape, cooperates with the under side of the housing base 16 and the casing cover 26 to form upper and lower air passages within the casing 23 which are separated by a web 73. A baffle 74 extended across the upper passage divides this passage into an air passage 76 and an air chamber 77, while the lower passage 78 is continuous. The passages 76 and 78 constitute an air cooling passage for the pump 24, as will now be described.

One end 79 of the lower passage 78, which will be termed the inlet end of the air cooling passage, is open to the space 81 within the housing 14 (Fig. 4) by the provision of a hole 80 extended axially of the casing 23 adjacent to the end A of the H-shape casing portion and positioned for registry with an opening 82 formed in the housing base 16. At the end A' of the H-shape casing portion, the web member 73 is formed with an opening 84 to connect the upper air passage 76 with the lower air passage 78. That end 88 of the upper air passage 76, adjacent to the baffle member 74 is arranged for registration with an opening 89 provided in the housing base 16, which opening 89 will hereinafter be termed the outlet of the pump air cooling passage. An elbow connection 91 (Figs. 2 and 4), secured to the top side of the housing base 16, connects the outlet 89 of the air cooling passage with the inlet 71 of the air distributing means 12.

Atmospheric air is admitted to the housing space 81 through openings 92 formed in the housing 14, so that such space 81 constitutes an atmospheric air chamber. Thus atmospheric air enters the inlet 79 of the pump air cooling passage through the registered openings 80 and 82, as indicated by the arrows 94, flows through the lower air passage 78 and then upwardly therefrom through the opening 84 into the upper air passage 76, as shown by the arrows 96, and then outwardly and upwardly from the upper air passage 76 into the elbow 91, as illustrated by the arrows 97, to the inlet 71 of the air distributing means 12.

From the air distributing means inlet 71 the atmospheric air flows through the valve stem passage 52 to its end 53 and into one of the air passages 57, as shown by the arrows 98. The air in a passage 57 travels to a teat cup 66 through the conduit 63 to contract or depress the inflation 99 (shown in Fig. 1) in a usual manner.

On registration of the slot 56 in the valve head member 46, with an air passage 57, to connect such passage with the subatmospheric chamber 48, the air is exhausted from a teat cup 66 to provide for a reversed flow of the air in the passage 57, as indicated by the arrow 101 (Fig. 4). It is apparent that when this reversed air flow takes place in the conduit 63 the inflation 99 is expanded.

The chamber 48 is maintained at a subatmospheric pressure by the provision of an air passage 100, formed in the body member 35, and open to the chamber 48 so as to constitute an outlet at a subatmospheric pressure for the air distributing means 12. This outlet passage 100 is in registration with an opening 102 formed in the housing base 16 at a position opposite the pump inlet 103, which is at one end of an air chamber 104 formed in the pump casing 23 by the casing cover 26 and the housing base 16. The pump outlet 106 is at the opposite end of the air chamber 104, with the admission of air to and the discharge of air from the pump through a common cylinder opening 107 being controlled by a rockable baffle member 108. Reference is made to U. S. Patent 2,427,312 for a more detailed description of the construction and operation of the baffle member 108.

The pump outlet 106 is in registration with an opening 109 in the housing base 16, so as to connect this outlet with an exhaust air chamber 111 (Figs. 2 and 4) formed within the housing 14 and open to the atmosphere through exhaust openings 112 in the housing 14.

Thus as shown in Fig. 4, air from the subatmospheric chamber 48 is exhausted through the outlet passage 102 and into the pump inlet 103, as indicated by the arrows 113; from the pump inlet 103 into the cylinder opening 107 and through the pump 24, as shown by the arrows 114; then outwardly through the opening 107 and into the pump outlet 104, as shown by the arrows 115; and, finally, upwardly from the pump outlet 104 and through the opening 102 into the exhaust chamber 111 for discharge to the atmosphere through the exhaust openings 112, as indicated by the arrows 116.

Referring to Fig. 4, therefore, it is seen that air from the atmospheric chamber 81 is initially directed to flow about the pump casing 23 through the air passages 78 and 76 prior to its admission into the air distributing means 12. After flowing through the air distributing means 12, the air is directed to the pump 24 for discharge to the atmosphere. By virtue of this travel of the air any milk that might become entrained in the air during its flow through a teat cup, as will occur in the event of any leakage through or rupture of the inflation 99, is positively withdrawn from the teat cup and air distributing means 12 by the suction action of the pump, and is then carried through the pump and positively discharged to the atmosphere by the pressure action of the pump. Any milk accumulations in the power unit 10, and the resultant objections to odors and cleaning, are thus entirely eliminated.

Further, it will be importantly noted that the serpentine cooling passage for the pump 24 carries only atmospheric air for admission to the air distributing means 12. This passage is thus entirely free of any milk that might be admitted into the air passages from a teat cup 66. Since only air alone is permitted to travel through the pump air cooling passage, no cleaning of this passage is required or is necessary.

The space within the milk receptacle 32 is maintained at a subatmospheric pressure by the provision of an opening 121 (Fig. 4) formed in the pump casing 23 for registration with the pump inlet 103. The pump cover 26 is provided with an opening (not shown) which is in alignment with the pump casing opening 121. Air is thus exhausted directly from the milk receptacle into the pump inlet 103.

Although the invention has been described with respect to a preferred embodiment thereof it is to be understood that it is not to be so limited since changes and modifications can be made therein which are within the full intended scope of this invention, as defined by the appended claims.

I claim:

1. In a milking machine, an air distributing means for a teat cup, a rotary pump, having a casing, for evacuating air from said air distributing means, said air distributing means having an air intake portion and an air discharge portion, and said pump having an inlet and an outlet, with the casing for said pump being formed with a series of inter-connected air cooling passages having an inlet portion open to the atmosphere and an outlet portion, means fluid connecting said outlet portion with said air intake portion, and other means fluid connecting said air discharge portion with said pump inlet, with said pump outlet being open to the atmosphere.

2. In a milking machine, an air distributing means for a teat cup, a rotary pump for exhausting air from the air distributing means, said air distributing means having an air intake portion and an air discharge portion and said pump having an inlet and an outlet, a housing structure for said air distributing means and pump having an air inlet and an air outlet both of which are open to the atmosphere, with that portion of the housing structure enclosing said pump being formed with a series of inter-connected cooling air passages having an inlet portion in fluid communication with the air inlet of said housing structure and an outlet portion, a fluid connection between the air intake portion for said air distributing means and said outlet portion, a second fluid connection between the discharge portion of said air distributing means and the inlet of said pump, and means fluid connecting the pump outlet with the air outlet for said housing structure.

3. In a milking machine, an air distributing unit for a teat cup and a rotary pump unit, having a casing, for exhausting air from said air distributing unit, said two units being arranged in a superposed relation, with said air distributing unit having an air intake portion and an air discharge portion and said pump having an inlet and an outlet, said casing being formed with a series of inter-connected air cooling passages havng an atmospheric inlet portion and an outlet portion terminating in the side of said casing adjacent to said air distributing unit, with the inlet and outlet for said pump unit being located in said adjacent side of the casing, and the air intake portion and air discharge portion for said air distributing unit being arranged in the side thereof adjacent to said casing, said two units being relatively arranged so that said passage outlet portion and said discharge portion are in registration, respectively, with said air intake portion and said pump unit inlet, with said outlet of the pump unit being open to the atmosphere.

ELMER B. THOMPSON.

REFERENCES CITED

The following references are of record in the file of this patent:

UNITED STATES PATENTS

| Number | Name | Date |
| --- | --- | --- |
| 2,427,312 | Thompson et al. | Sept. 9, 1947 |